Figure 5:
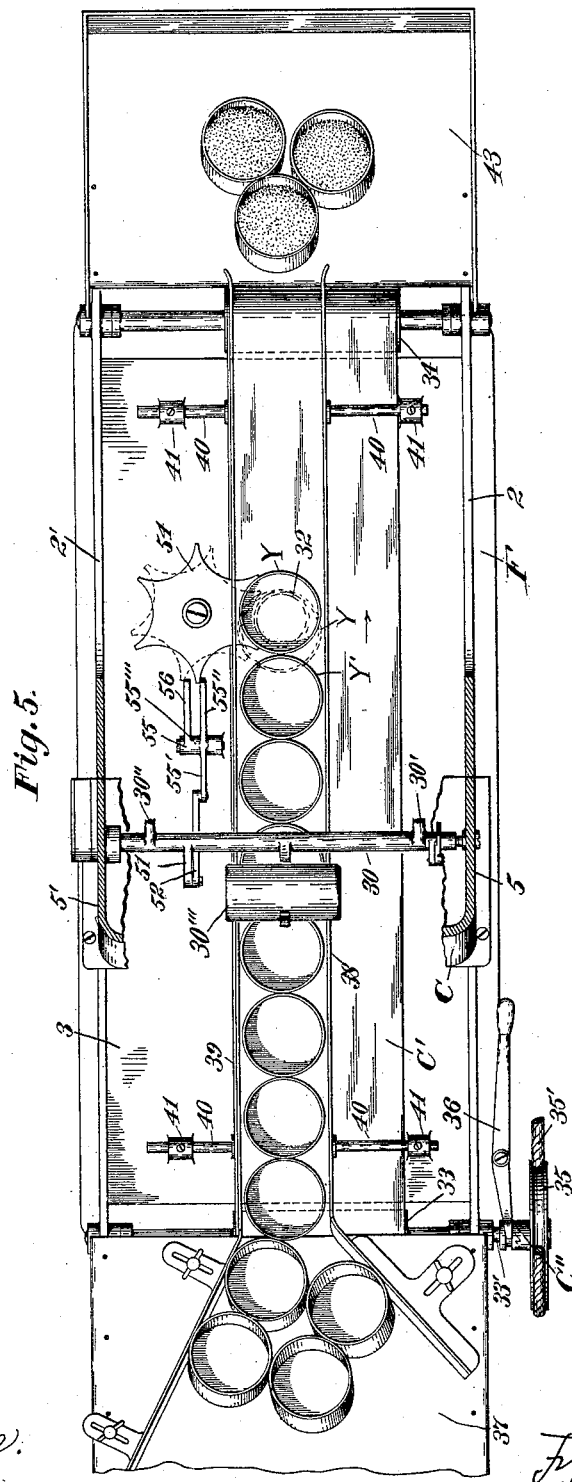

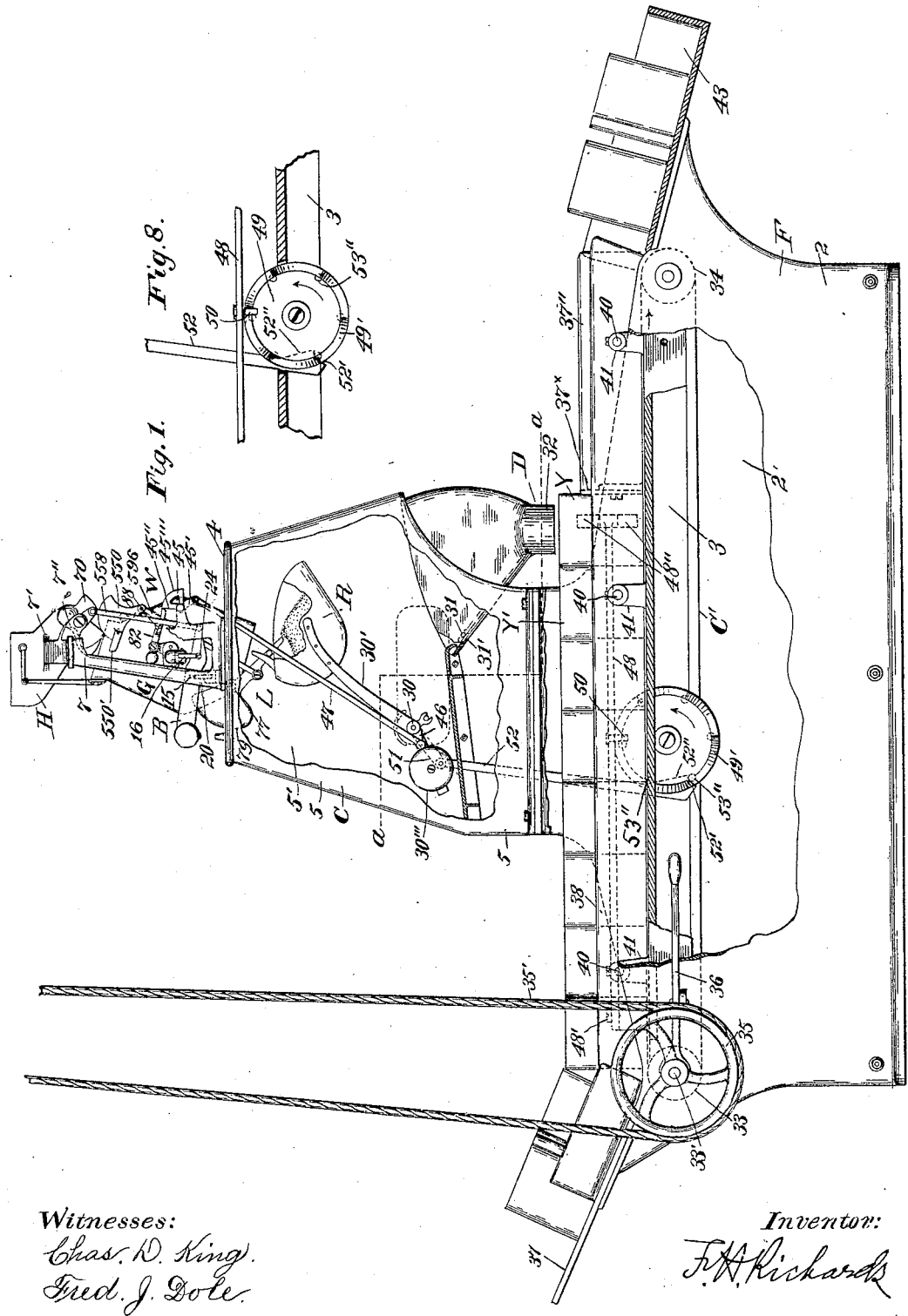

(No Model.) 4 Sheets—Sheet 2.
F. H. RICHARDS.
WEIGHING MACHINE.
No. 565,225. Patented Aug. 4, 1896.
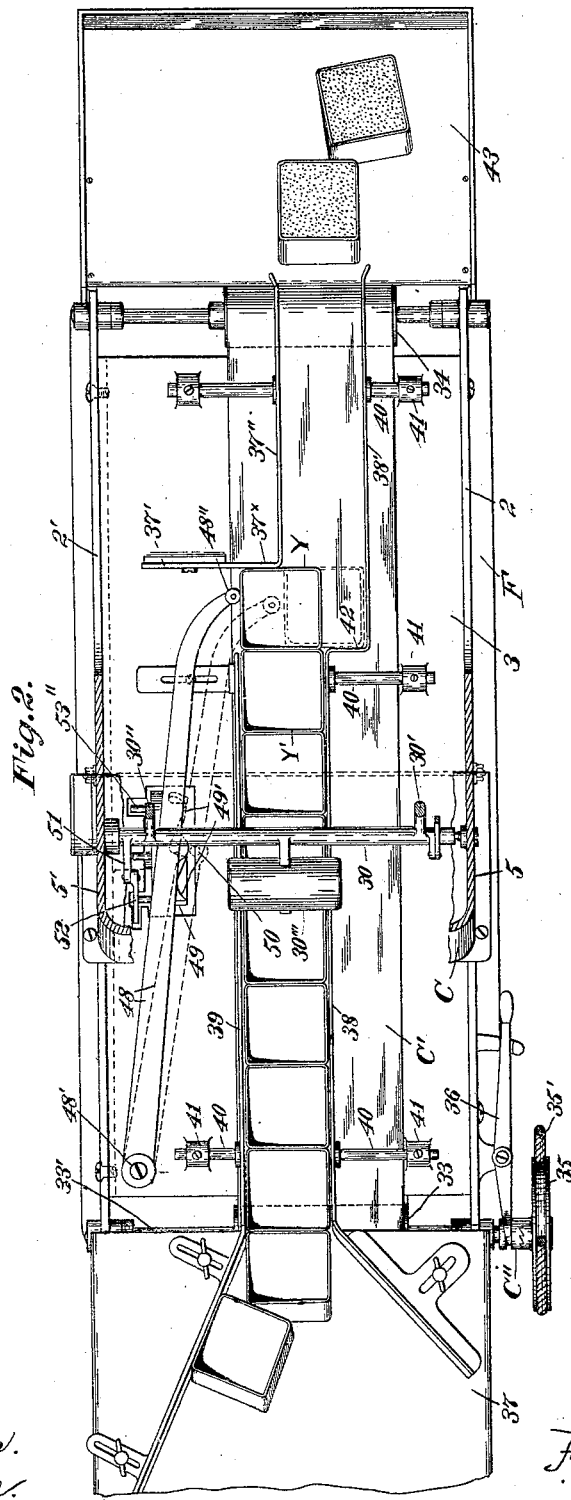
Witnesses:
Chas. D. King.
Fred. J. Dole.
Inventor
F. H. Richards (No Model.) 4 Sheets—Sheet 3.
F. H. RICHARDS.
WEIGHING MACHINE.
No. 565,225. Patented Aug. 4, 1896.
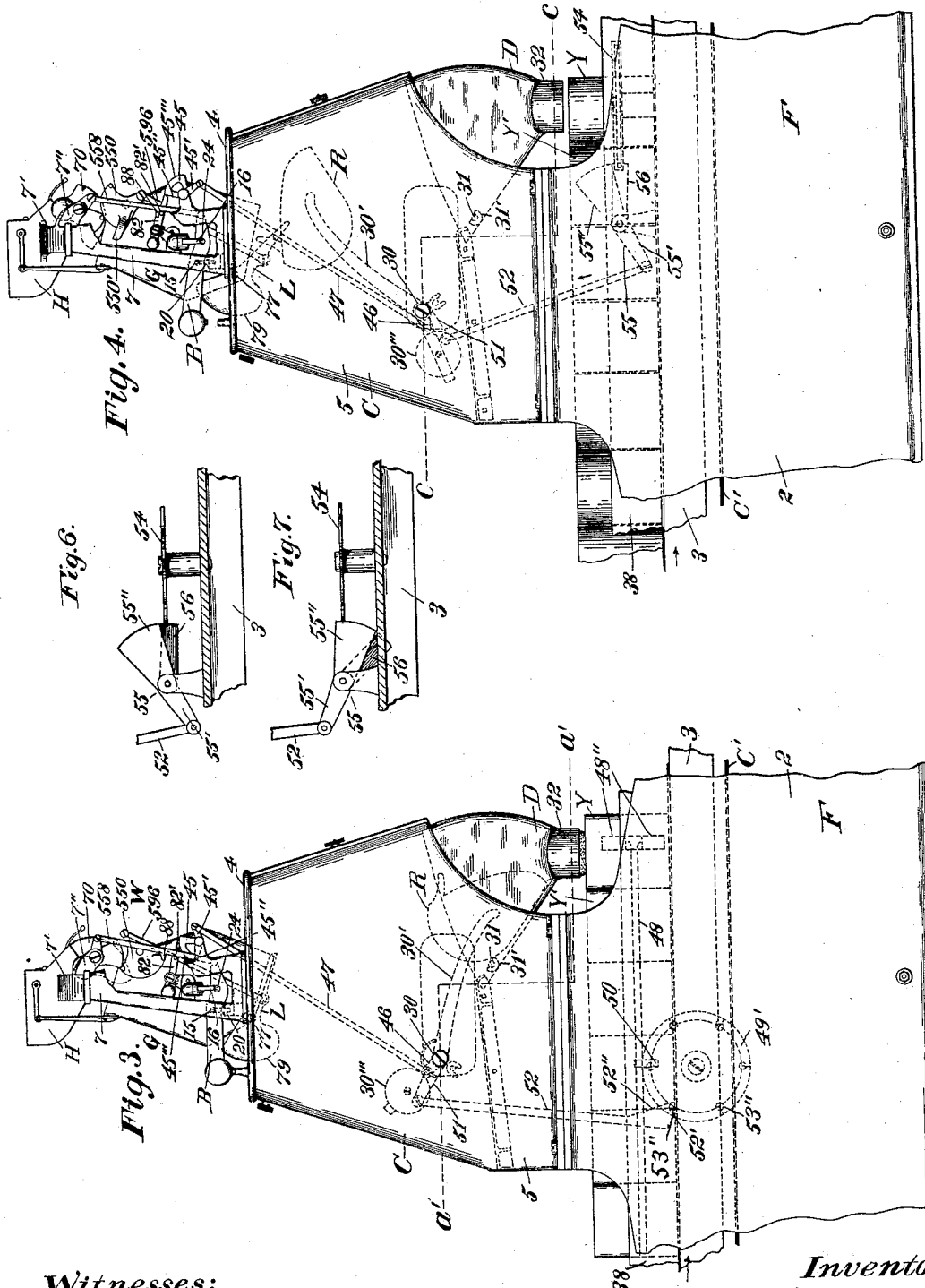
Witnesses:
Chas. D. King.
Fred. J. Dole.
Inventor:
F. H. Richards, (No Model.)  
4 Sheets—Sheet 4.

F. H. RICHARDS.
WEIGHING MACHINE.

No. 565,225.  Patented Aug. 4, 1896.

Witnesses:  
Chas. D. King.  
Fred. J. Dole.

Inventor:  
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 565,225, dated August 4, 1896.

Application filed February 29, 1896. Serial No. 581,266. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing and packing apparatus.

The object of the invention is to provide improved mechanism operable in connection with weighing mechanism and adapted for automatically placing in position a receptacle or vessel for receiving a weighed or completed bucket-load from said weighing mechanism and for displacing the filled receptacle or vessel.

In the drawings accompanying and forming part of this specification, Figure 1 is a left-hand end elevation of the apparatus, an empty box being shown in position for receiving a bucket-load from the weighing mechanism. Fig. 2 is a plan view of the apparatus, parts thereof being in section, on the line $a\ a$, Fig. 1, and $a'\ a'$, Fig. 3, the operative mechanisms being in position corresponding with Fig. 1. Fig. 3 is a left-hand elevation of part of the apparatus, showing a box in position to receive a bucket-load, and showing the latter flowing into said bucket. Fig. 4 is a left-hand end elevation of part of the apparatus, showing a modified form thereof. Fig. 5 is a plan view of said modified form of apparatus, parts thereof being in section, on the line $c\ c$, Fig. 4. Figs. 6 and 7 are detail views of escapement feed mechanism, and Fig. 8 is a detail of part of a can-releasing means.

Similar characters of reference designate like parts in all the figures of the drawings.

One of the constituent elements of the apparatus is a weighing mechanism, which may be of any suitable construction; but for convenience in illustrating the nature, purpose, and operation of my present improvements I have illustrated and will hereinafter describe improved weighing mechanism of the type shown and described in Letters Patent No. 548,840, granted to me October 29, 1895, to which reference may be had.

A bed or base for supporting the operative mechanisms of the apparatus is shown at F, comprising the end plates 2 and 2', connected near their top by the plate 3. There is also shown, formed integrally with said end frames 2 and 2', the end walls 5 and 5' of the casing or chamber C, which is adapted for containing certain of the operative mechanisms of the apparatus, the top plate 4 of said casing constituting a means for supporting the framework of the weighing mechanism, which latter is designated in a general way by W. The plate 4 on one end thereof is shown provided with a beam-support 20, illustrated as a V-shaped bearing, and which will be duplicated at the opposite end thereof, these beam-supports pivotally supporting the scale-beam, which is designated in a general way by B, and which latter carries pivots or knife-edges 15, adapted to be supported by said V-shaped bearings 20. The beam-arms of the scale-beam will also carry bucket-supports, one of which latter is illustrated at 24, for supporting bearings 16, carried by hangers on the ends of the bucket, which latter is designated in a general way by G.

The framework for supporting the operative parts of the weighing mechanism comprises two side frames or uprights, one of which is shown at 7, and which side frames are connected by a plate or beam 7'. The connecting plate or beam 7' is shown carrying the supply chute or hopper H, which is adapted for containing the material to be weighed and packed, and which may be supplied thereto in some well-known manner.

The bucket mechanism comprises two members, one of which is shiftable relatively to the other for discharging the bucket-load, and the bucket-closer L is shown constituting such shiftable member. The bucket-closer L is shown pivoted at 77 to the lower side of the bucket and adjacent to one side of the discharge-opening thereof, being provided with counterweighted arms or plates 79, which are adapted for returning it to its closed position.

As a means for supporting the bucket-closer L an inverted toggle is shown, which comprises the rocker 550, pivoted on the bucket G, and a relatively long connecting-rod 596, pivotally connected to said rod and to the rocker in such a manner that when the closer is shut the two pivots of said connecting-rod will be nearly in line with, and the upper of said pivots will be above, the rocker-pivot, so that when said rocker is engaged by the bucket-closer latch and held in that position the closer will be supported with a minimum pressure on the latch, as practically all of the weight of the bucket contents will be carried on the pivot of the rocker.

The closer-latch for locking the rocker in position when the closer is shut, as shown in Fig. 3, is designated by 82, and it is shown pivotally supported on one end of the bucket and having a detent or stop in position for engaging a coöperating stop or detent on one end of the detent-arm 550' of the rocker when the parts are in the closed position previously described. In the embodiment shown this closer-latch swings upwardly to engage the rocker, and it will be evident that it may be released by a downward thrust or movement, so that the closer may be thereby freed, at which point the weight of the bucket contents pressing against said closer will force the same open for discharging the bucket-load.

As a means for controlling the supply-stream from the chute or hopper H, I prefer to employ the improved valve shown and described in Letters Patent No. 535,727, granted to me March 12, 1895, to which reference may be had. This valve will be located for oscillatory movement beneath the mouth of the supply-chute, being pivotally supported between arms or brackets depending from the top plate 7, one of said brackets being shown at 7''.

As a means for actuating the valve to close the same any suitable mechanism may be employed—for example, the improved valve-actuating mechanism shown and described in Letters Patent No. 548,843, granted to me October 29, 1895, to which reference may be had.

As a means for actuating the valve 70 to open the same I prefer to employ the means illustrated, which will now be described.

A relatively long connecting-rod is shown at 558, pivotally connected with the valve, to the rear of the center of movement thereof, the lower end of said rod being in position to be engaged by the scale-beam B or one of the arms thereof (see Fig. 1) on the ascent of said scale-beam and return thereof to its normal position, (see Fig. 3,) thereby imparting an upward thrust to said rod 558 sufficient for opening the valve to again permit the flow of the supply-stream into the bucket.

A tilting or oscillatory receptacle, constituting the subject-matter of a concurrently-pending application, Serial No. 580,689, filed February 25, 1896, is shown located beneath the bucket of the weighing mechanism, and it is adapted, when in its normal position, to receive a discharged bucket-load therefrom and to have a descending movement for discharging its contents.

A pivotally-supported rock-shaft is shown at 30, carrying the upwardly-extending relatively long receptacle-carrying arms 30' and 30'', between and to which the receptacle or supplemental bucket R is secured by suitable holding means.

The receptacle R is counterbalanced, the counterbalance 30''' thereof tending to maintain the same in the normal or load-receiving position, as shown in Fig. 1, and for returning the same to said position on the discharge of its contents into a suitable package, can, or the like in a manner to be hereinafter described.

In connection with the weighing mechanism a suitable conveyer will be employed for supporting and for carrying a suitable can or other receptacle into position for receiving a weighed bucket-load discharged by the bucket of the weighing mechanism, suitable means, operative with said weighing mechanism, being also employed for controlling the movement of such receptacle or receptacles on said carrier.

The casing C is illustrated provided with a discharge-chute D, the end walls of the latter being provided with pintles 31, resting on bearings 31', formed on or carried by the inner faces of the end walls of the casing C, so that said discharge-chute may be swung up from its normal position and out of the way for transportation or other purposes. The discharge-chute is also shown provided with the cylindrical spout 32, which directs the discharged mass into a suitable box, can, or the like intended for its reception.

The carrier or conveyer for conveying or moving a receptacle or vessel into position for receiving a bucket-load is designated by C', and it is shown consisting of an endless band or belt of suitable material supported by the rolls 33 and 34, the shafts of the latter being shown journaled in the end frames or plates of the bed F, the direction of movement of the carrier or conveyer being indicated by the arrow in Fig. 1.

The carrier or conveyer C' will carry a receptacle into position for receiving a bucket-load, at which point such receptacle will be momentarily held, though the carrier C' in the form shown continues to move, by a suitable device, such as a stop, to permit the flow thereinto of a weighed bucket-load.

When the material has filled said receptacle, means for releasing the same will be brought into play for moving the same from said position, so that it may be also carried away by the carrier C' and a succeeding receptacle placed into position for receiving the next bucket-load from the weighing mechanism.

The shaft 33' is illustrated projecting beyond the end frame 2 and carrying a band or belt wheel 35, connected by the band 35' to the power or drive wheel of a suitable motor, (not shown,) by which the carrier C' may be actuated. The drive-shaft 33' of the carrier is shown provided with a clutch, (designated in a general way by C'',) through which the carrier C' may be either thrown into or out of action, said clutch being operated by the pivotally-supported hand-lever 36.

A receiving-table is shown at 37, suitably secured to the bed F of the apparatus, which table receives the cans or other receptacles to be filled, and from which they may be supplied to the conveyer C' to be moved along therewith and under the spout 32 of the discharge-chute D to receive a weighed bucket-load, in which position they are held by a suitable device, (illustrated in Fig. 1 as a laterally-adjustable stop,) consisting of the right-angled plate 37×, the lateral portion thereof 37' constituting a stop, and the longitudinal portion 37" constituting the complementary portion of a guide for guiding said filled receptacles toward the delivery trough or hopper 43, which is secured to the bed of the apparatus in some suitable manner, and from which they may be removed.

A guide for guiding the empty receptacles to a position to be filled is provided, and it is shown consisting of the laterally-adjustable plates 38 and 39, secured to the inner ends of rods, as 40, which latter bear in brackets, as 41, carried by or formed on the top plate 3 of the bed F, and by moving said rods inwardly or outwardly relatively to their bearing-brackets the space between the plates 38 and 39 may be decreased or increased to adapt the guide to receptacles of varying sizes. The plate 38 is shown provided with the transverse portion 42, which constitutes a complementary guide portion for the transverse portion 37' of the plate 37× for guiding a filled receptacle away from its load-receiving position and between the portions 38' and 37" of the plates 38 and 37×, said last-mentioned plates constituting a means for guiding the filled can or receptacle to the delivery chute or trough 43.

It will be remembered that a load-receiving bucket has been described as supported beneath the weighing mechanism and for receiving when in its normal position a weighed bucket-load. This receptacle R has also a descending movement from such normal position for discharging its contents into the discharge-chute D, the spout 32 of which latter directs the material into a receptacle on the conveyer C'.

It will be remembered also that a latch has been described as normally operative for holding the bucket-closer L against opening movement by engaging the rocker or toggle member 550 when said bucket-closer is in its closed position. When depressed or thrown into its inoperative position by a suitable actuator, the bucket-closer L will be released for discharging the bucket-load into the bucket R. For effecting the release of the bucket-closer I prefer to employ the actuator shown, which is illustrated as a device 88, carried by the connecting-rod 558 and in position for engaging a pin 82' on the latch 82 to the rear of the pivot thereof. On the engagement of this pin 82' by the actuator 88, and the further closing of the valve with which the connecting-rod 558 is operative, the latch 82 will be thereby depressed by the action of the closing valve, thereby disengaging the detents of said latch and rocker, whereby the bucket-closer L will be also released for discharging the bucket-load into the receptacle R, as shown in Fig. 1. The latch 82 also serves an additional function, it constituting a stop member and being adapted, when thrown to a position to release the bucket-closer L, to also prevent the discharge movement of the receptacle R while the closer L is open and the bucket G is discharging its load into said receptacle by engaging a coacting stop 45, operative with the receptacle R, said stop being of segmental shape and supported for rocking movement by the framework of the weighing mechanism.

The counterweighted rock-shaft 30 is shown provided with the forwardly-projecting rock-arm 46, which is operatively connected by the connecting-rod 47 with the stop 45, said connecting-rod being shown pivotally connected with said rock-arm 46 and the rock-arm 45' of the stop 45.

The stop 45 is operative with the movably-supported receptacle R, and has a rocking movement in unison therewith, being, as hereinbefore described, operatively connected with said receptacle R, so that by limiting the movement of said stop 45 the movement of the receptacle R will be likewise limited. The rocking stop is provided with a supplemental stop-face 45", against which the latch 82 will impinge when the latter is thrust downward for releasing the bucket-closer L, so that rocking movement of said stop about its pivot, and hence the discharge movement of the receptacle R, will be prevented until the latch 82 has resumed its normal or closer-latching position, at which time said latch will have intersected the plane of curvature of the curved face 45''' of the stop 45, so that the latter may rock about its pivot and the receptacle R be released and tilt or oscillate for discharging its contents into the discharge-chute D, to be directed thereby into a suitable receptacle supported on the carrier C' under the spout 32. As the stop 45 rocks about its pivot, the curved face 45''' will engage with the latch 82, holding the latter in its normal position, this relation continuing while the receptacle R is in its discharging position, as indicated in Fig. 3.

A relatively long lever, which is designated by 48, is illustrated constituting a means for releasing a filled receptacle by moving the latter away from the stop 37× along the transverse guideway and past the stop 37' and between the plates 38' and 37", which latter constitute a guide, the carrier C then moving the filled receptacle toward and into the delivery-trough 43, from whence they may be removed.

The lever 48 is shown pivotally supported at 48', having a relatively long stroke, the working end thereof being shown provided with antifriction-rolls 48″, which serve their well-known purpose. This lever 48, at a predetermined point in the operation of the apparatus, is adapted to push a filled receptacle past the stop 37×, and for actuating said lever at this point I prefer to employ a cam which is in position to be actuated by connections operative with the weighing mechanism, and on the ascending movement of the receptacle R, as this returns to its normal position to receive a weighed bucket-load from the weighing mechanism.

A cam-wheel is shown at 49, suitably supported by the end plate 2′ of the framing and working through openings in the top plate 3 of the latter. This cam-wheel 49 is shown provided with a circular series of cams 49′ in position for engaging a downward projecting pin or like device 50 on the lever 48, whereby, as said cam-wheel is rotated in the direction of the arrow, the lever 48 may be moved inward by one of the cams 49′ engaging the depending pin 50 thereon to push a filled receptacle past the stop 37×.

The cam-wheel 49 will be preferably rotated by means operatively connected with the receptacle R.

The supporting rock-shaft 30 of the receptacle R is shown provided with a forwardly-projecting rock-arm 51, which in turn is shown provided with the depending actuator 52, the lower end of which latter is shown provided with a curved working face 52′.

It will be evident that as the receptacle R ascends the rock-arm 51 of the supporting-shaft 30 thereof will move in an opposite direction. As the receptacle R ascends, the rock-arm 51 will be moved downward, so that the actuator 52, carried thereby, will be effective for rotating the cam-wheel 49 a distance corresponding to the stroke of said actuator.

The outer face of the cam-wheel 49 is shown provided with a series of pins or dogs 53″, projecting laterally therefrom, one of which is adapted to be engaged by the curved working face 52′ on the lower end of the actuator 52 on each descent of the rock-arm 51 and ascent of the receptacle R, whereby the cam-wheel 49 may be given a partial rotation to cause the releasing-lever 48 to move a filled receptacle away from its load-receiving position under the spout 32.

It will be evident that when said loaded receptacle is moved from such position and past the stop 37× the carrier C′ may move a succeeding or empty receptacle into position and against the stop 37× for receiving a succeeding bucket-load from the weighing mechanism on the descending movement of the receptacle R.

The actuator 52 near the lower end thereof is shown provided with the inclined guide-face 52″, which, as the rock-arm 51 and the actuator 52 ascend, will ride over a pin 53″′, so that when said actuator 52 has assumed its normal or working position the curved working face 52′ may drop on the following pin 53″′ to partially rotate the cam-wheel 49 on the next stroke of the rock-arm 51 for effecting the result hereinbefore described.

In Figs. 4, 5, 6, and 7 I have illustrated a modification of the invention which is more especially adapted for the placing and displacing into and from position of a round can or vessel, which modification will be now described.

An escapement or star wheel is shown at 54, the spaces between the teeth thereof being inwardly curved or concave, this curvature substantially conforming to that of a can or receptacle to be filled. This escapement or star wheel 54 is so positioned as to be normally rotated by a can or vessel as this is moved or carried along by and with the carrier or conveyer C′.

At a predetermined point in the operation of the apparatus, however, the escapement-wheel 54, and thereby the can or other vessel, will be held against movement to permit the flow into said vessel of a bucket-load from the weighing mechanism, a detent or stop the movement of which is controlled from and by the weighing mechanism being employed for preventing rotative movement of the star-wheel 54. When the detent releases the escapement, it will be evident that the receptacle or vessel formerly held thereby will be released, so that the filled receptacle on the carrier C′ may be guided toward the delivery-trough 43 between the two plates 38 and 39, which constitute a guide for this purpose.

A detent-lever is shown at 55, comprising the oppositely-projecting arms 55′ and 55″, the first-mentioned of which is operatively connected with the rock-arm 51 of the shaft 30 by the connecting-rod 52, the other arm constituting a stop or detent for preventing the rotation of the escapement or star wheel 54 when this is in its normal position (see Fig. 5) and a weighed bucket-load is flowing into said receptacle so held by the escapement-wheel 54.

A second detent is shown at 56 in the form of a rock-arm carried by the hub 55″′ of the lever 55, and which is adapted for engaging one of the teeth or arms of the escapement-wheel 54 as this is rotated by a filled can, and preventing its continued rotation by the oncoming cans on the carrier C′ while the receptacle R is in its bucket-load-receiving position, as indicated in Figs. 4 and 6. The operation of this mechanism is as follows:

On reference to Fig. 4 it will be assumed that the receptacle R has received the last portion of a bucket-load from the weighing mechanism, and, being free of all restraint, is in a condition to descend for discharging its contents. On the descent of the receptacle R the rock-arm 51, and hence the connecting-rod 52 and the arm 55′, will be moved in the direction of the arrow in Fig. 4, the receptacle Y prior to this point having been nearly below the spout 32. On the movement of these mechanisms in the direction indicated the detent-arm 56 will be thrust downward and out of engagement with the tooth 54' of the escapement-wheel 54, and below the plane of the under face thereof, whereby said wheel may be rotated by an on-coming can for a limited distance or against the lever-arm 55", which has been thrust downward by the action of the descending bucket R, intersecting the plane of movement of the teeth of the escapement-wheel 54, so that said arm 55 is adapted for holding the can in a position for receiving a weighed load from the spout 32. (See Figs. 5 and 7.) On the ascending movement this operation will be reversed, whereby the filled can may be moved from under the spout 32 and a succeeding empty can placed in position for receiving the next bucket-load discharged by the weighing mechanism.

The operation of the hereinbefore-mentioned apparatus, briefly described, is as follows: Fig. 1 represents the tilting bucket R as having received a bucket-load from the weighing mechanism W and as about in condition to descend for discharging its contents into the discharge-chute D. When the latch 82 has ascended above the plane of the curved stop-face of the stop-segment 45, the filled receptacle, overbalancing its counterweight 30''', may tilt or oscillate for discharging its contents into the discharge-chute D and from thence into the empty properly-positioned box Y through the spout 32, as shown in Fig. 3. When the bucket R has discharged its contents into the box Y, the counterweight 30''' of said receptacle overbalances the same, the latter being then empty, and returns said receptacle R to its normal position. As the bucket R descends the actuator 52 through operative connections therewith will ascend, so that the inclined guide-face 52" of said actuator, riding over one of the pins, as 53", (see Fig. 1,) may pass thereby, and the curved working face 52' of said actuator may drop on said pin 53" during the discharge period of the receptacle R, as indicated in Fig. 3. On the ascending movement of the receptacle R the actuator 52 will be thrust downward, this action partially rotating the cam-wheel 49, so that one of the cams 49' thereof, riding over the pin 50 on the relatively long lever 48, will thereby move said lever inward. As the lever 48 is moved inward the antifriction-rolls 48" thereof will push the filled box Y inward past the stop 37<sup>×</sup>, so that when said receptacle Y has passed said stop it may be moved toward and into the trough 43 by the carrier C'. When the filled receptacle Y has been moved out of its load-receiving position, the succeeding receptacle Y' may be moved into place by the carrier C and against the stop 37<sup>×</sup> to receive a bucket-load on the succeeding operation of the weighing mechanism. As the empty box Y' is moved along by the carrier C' it will engage the rolls 48" of the lever 48 and thrust the same outwardly to its normal position, as indicated by the full lines in Fig. 2, where said lever may effect the removal or release of said box Y' on the succeeding operation of the apparatus.

Having thus described my invention, I claim—

1. In an apparatus of the class specified, the combination with weighing mechanism embodying a bucket; of a conveyer for supporting a receptacle, and for moving the same into position for receiving a bucket-load; and means operative with said weighing mechanism for controlling the movement of said receptacle on said conveyer.

2. In an apparatus of the class specified, the combination with weighing mechanism embodying a bucket; of a conveyer for supporting a receptacle, and for moving the same into position for receiving a bucket-load; a stop for holding said receptacle in such position, and means operative with said weighing mechanism for releasing said receptacle.

3. In an apparatus of the class specified, the combination with weighing mechanism embodying a bucket; of a conveyer for supporting and moving a receptacle into position for receiving a bucket-load; guiding means for said receptacle; a stop for holding said receptacle in such position; and means operative with said weighing mechanism for releasing said receptacle.

4. In an apparatus of the class specified, the combination with weighing mechanism embodying a bucket; of a conveyer for supporting a receptacle, and for moving the same into position for receiving a bucket-load; an adjustable guide for said receptacle; a stop for holding said receptacle in such position; and means operative with the weighing mechanism for releasing said receptacle.

5. In an apparatus of the class specified, the combination with weighing mechanism embodying a bucket; of a conveyer for supporting and moving a receptacle into position for receiving a bucket-load; and a counterbalanced receptacle located beneath the bucket of the weighing mechanism and adapted to receive a bucket-load therefrom, and also having a discharge movement for discharging its contents into the receptacle on said conveyer.

6. In an apparatus of the class specified, the combination with weighing mechanism embodying a bucket; of a receptacle normally located to receive a load from said bucket; a conveyer for supporting and moving a vessel into position for receiving said bucket-load; and means operative with the weighing mechanism for releasing said receptacle.

7. In an apparatus of the class specified, the combination with weighing mechanism embodying a bucket; of a tilting receptacle located beneath said bucket, and adapted for receiving a load therefrom; a conveyer for supporting a receptacle, and for moving the same into position for receiving the contents from said tilting receptacle; a stop for holding said receptacle in such position; and means operative with said tilting receptacle for controlling the movement of the receptacle on said conveyer.

8. In an apparatus of the class specified, the combination with weighing mechanism embodying a bucket; of a conveyer for supporting and moving a receptacle into position for receiving a bucket-load; a stop for holding said receptacle in such position; and a lever operative with the weighing mechanism for effecting the release of said receptacle on said conveyer.

9. In an apparatus of the class specified, the combination with weighing mechanism embodying a bucket; of a conveyer for supporting and moving a receptacle into position for receiving a bucket-load; a stop for holding said receptacle in such position; a releasing-lever for said receptacle; a lever-operating cam; and means for actuating said cam.

10. In an apparatus of the class specified, the combination with weighing mechanism embodying a bucket; of a conveyer for supporting and moving a receptacle into position for receiving a bucket-load; a stop for holding said receptacle in such position; a releasing-lever; a rotative member having a cam or cams for operating said lever, said rotative member having a pin or pins thereon; and a movable member adapted for engaging said pin or pins to thereby rotate said member, whereby said releasing-lever will be operated through the cams on said rotative member.

11. In an apparatus of the class specified, the combination with weighing mechanism embodying a bucket; of a tilting receptacle located to receive a bucket-load; a conveyer for moving a receptacle into position for receiving a bucket-load from said tilting receptacle; a stop for holding said receptacle in such position; a lever for releasing said receptacle, said lever having a pin; a wheel having a series of cams thereon, and having also a series of pins; and a member operative with said tilting receptacle, and having a movement therewith; said member having a working face adapted to engage one of the pins on said wheel, to thereby rotate the latter on such movement of said tilting receptacle.

12. In an apparatus of the class specified, the combination with a conveyer for supporting and moving a vessel into position for receiving a charge of material from a suitable source of supply; of means for holding said vessel in such position; a releasing-lever for said vessel; a lever-operating cam-wheel having a series of projections thereon; and a device for engaging one of said projections, to thereby partially rotate said cam-wheel.

13. In an apparatus of the class specified, the combination with a conveyer for supporting and moving a vessel into position for receiving a charge of material from a suitable source of supply; of a stop for holding said vessel in its loading position; a suitably-supported lever operable for releasing such vessel, and having a projection; a wheel having a series of cams adapted to engage said projections on the lever, said wheel having also a series of projections; and an actuator adapted to engage one of said projections, to thereby partially rotate the wheel.

14. In an apparatus of the class specified, the combination with weighing mechanism embodying a bucket; of a receptacle located below said weighing mechanism; reciprocally-effective stops operative, respectively, with said weighing mechanism and receptacle; a conveyer operable for moving a vessel into position for receiving a load of material from said receptacle, discharged thereinto by the bucket of the weighing mechanism; and means operative with the weighing mechanism, for releasing said vessel.

15. In an apparatus of the class specified, the combination with weighing mechanism embodying a bucket; of a movably-supported receptacle located to receive a load of material from said bucket; a conveyer for supporting and moving a vessel into position for receiving the load from said receptacle; a stop for holding said vessel in its loading position; a lever operable for releasing said vessel; a lever-operating cam; and an actuator operative with said receptacle and adapted for actuating said cam.

16. In an apparatus of the class specified, the combination with a tilting receptacle located to receive a charge of material from a suitable source of supply; of a chute adapted for receiving a charge of material from said receptacle, said chute having a spout; a conveyer for supporting and moving a vessel into a position under said spout; a stop for holding said vessel in such position; a lever operable for releasing said vessel; a lever-operating cam; and an actuator for said cam operatively connected with said receptacle.

FRANCIS H. RICHARDS.

Witnesses:
 FRED. J. DOLE,
 F. N. CHASE.